Jan. 11, 1966 B. B. WOLSH 3,228,640
UNITARY PLASTIC PIPE SUPPORT CLIP
Filed Aug. 20, 1964

INVENTOR.
BERNARD B. WOLSH
BY
Sanford Schnurmacher
ATTORNEY

United States Patent Office 3,228,640

Patented Jan. 11, 1966

3,228,640

UNITARY PLASTIC PIPE SUPPORT CLIP

Bernard B. Wolsh, 2350 Fenwood Road, University Heights, Ohio

Filed Aug. 20, 1964, Ser. No. 390,923
2 Claims. (Cl. 248—72)

This invention relates to hangers and particularly to support for pipe.

Conducive to a better understanding of the invention it may be well to point out that in the installation of pipe and conduit in a building of the type having angle-iron trusses which support floors and ceilings, it is often necessary to secure long runs of pipe and/or conduit to the angle iron flanges of such trusses by means of metal hangers or clips which are secured in place by screws or bolts.

Since each hanger needs at least one bolt to secure it in place, it can be seen that a great number of holes must be drilled through the angle iron flanges, where a great deal of pipe is being installed.

Furthermore, if a hanger is accidentally located in the wrong place, new mounting holes must be drilled, since such hangers cannot be adjusted, once installed.

Again, being usually fabricated from sheet metal or iron or steel castings, such pipe hangers are subject to weathering and corrosion, and also involve electrolytic action when used to support copper pipe or tubing, unless separate insulating collars are interposed between the hangers and pipe.

The primary object of this invention, therefore, is to provide a one-piece pipe clip for attachment to angle-iron beam flanges that requires no drilling of the beam flanges for attachment thereto.

Another object of the invention is to provide a hanger clip that can be securely and permanently mounted in place without the use of screws or bolts, but which, at the same time, can be intentionally removed and replaced on the beam flange, to allow for changes or alteration in the location of the supported pipe.

Another object, is to provide a device of the type stated that requires no tools to mount it on or remove it from such beam flanges.

Still another object is to provide a pipe support clip that is made of molded plastic material having high dielectric strength; that is dimentionally stable under wide variations of heat and moisture; that never needs a protective coating, and that is pleasing in appearance.

Still another object is to provide such a plastic pipe clip that can be molded easily and inexpensively, as a single unit, with no moving parts; that requires no deformation or shaping in its application, or the use of accessory items for the mounting thereof.

These, and other objects of the invention will become apparent from a reading of the following specification and claims, together with the accompanying drawing, wherein:

Figure 1:
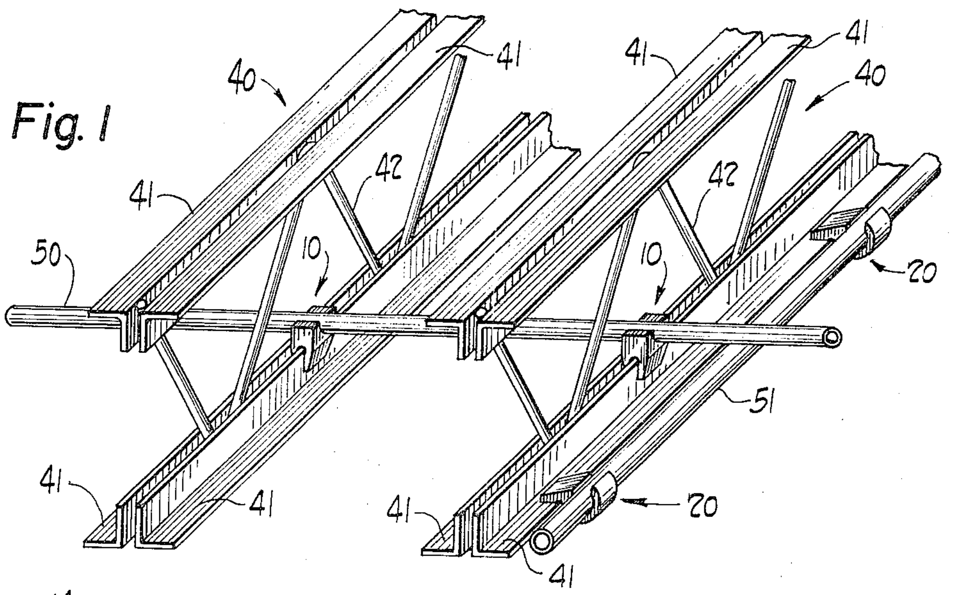
FIGURE 1 is a perspective view of a typical truss beam joist showing copper water pipes mounted both parallel to the beam flanges and at 90° to the beam flanges, by means of the molded plastic pipe support clips that are the subject of this invention.

Referring more particularly to the drawing, there is seen in FIGURE 1 thereof a section of floor or ceiling construction showing two parallel trusses 40 upon which two pipe lines 50 and 51 are supported crosswise thereof, and parallel thereto, by means of the molded plastic pipe support clips, that are the subject of this invention, broadly indicated by reference numerals 10 and 20, respectively.

The trusses 40 are of the conventional type, made up of paired sets of opposed angle irons, having flanges 41, spaced apart and joined together through tubular webbing 42 welded therebetween to form a light but rigid joist.

The clip 10 is molded from a suitable plastic having the desired characteristics of dielectric strength, dimensional stability over a wide temperature range, and high resistance to moisture and weather. Typical materials are "Nylon" or "Delrin."

The clips are molded as complete units requiring no assembling or finishing operations.

Figure 2:
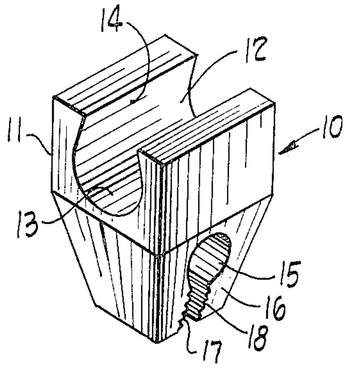
FIGURE 2 is a perspective view of one form of my molded plastic pipe support clip, adapted to supported a pipe line at 90° to a beam flange.

The clip 10, illustrated in FIGURE 2, has a body 11, with legs 16 and 17 defined by a slot 18 cut crosswise of the body.

The body also has a relief bore 15 at the inner end of the slot 18 which permits easy outward flexing of the legs while holding their opposed faces substantially parallel.

The opposed parallel faces of the legs 15 and 16 are serrated to provide increased frictional contact.

Reference numeral 14 indicates two upstanding and opposed concave jaws extending crosswise of the body 11 at 90° to the slot 18, separating the legs 16 and 17, and spaced upwardly therefrom.

The width of the opening 12 between the jaws 14 is less than the diameter of the jaw defining slot 13 so that a pipe positioned between the jaws will be securely embraced by the jaws, as seen in FIGURE 1.

Due to the inherent resilience of the plastic material used to form the clip, both the legs and jaws are capable of limited flexion.

In mounting a pipe line 50 crosswise of a series of trusses 40, as shown in FIGURE 1, the leg slot 18, of the clip 10, is aligned with the vertical flange 41 of one of the angle-irons of truss 40, and the clip body urged thereagainst.

The legs 16 and 17 will flex slightly and clamp the flange between them, thus securely mounting the clip 10 thereon, with the pipe jaw slot 13 positioned crosswise of the truss flange 41 at 90° thereto.

A series of such clips are lined up on adjacent truss flanges along the path that the pipe 50 is to follow, and the pipe line laid against the openings 12 between the jaws 14 of each clip, and pressed firmly downward until it is nested between the jaws.

The so held pipe line is positioned above the flanges 41, and is automatically insulated therefrom both electrically and physically, so that all vibration in the pipe line is damped, making for a quiet installation that is free from electrolytic action.

It will be noted that no bolts are required to anchor the clips 10 in place; nor was there any necessity to drill any holes in the flanges 41, or use any tools whatsoever.

Any incorrectly positioned clips 10 can be easily pulled away from the flanges and replaced anywhere on the flanges without leaving any disfiguring marks.

While the jaws 14 have been shown as positioned at 90° to the legs 16 and 17, they may be positioned parallel thereto, in which case the clips will support a pipe line parallel to and above the flange 41.

Figure 3:
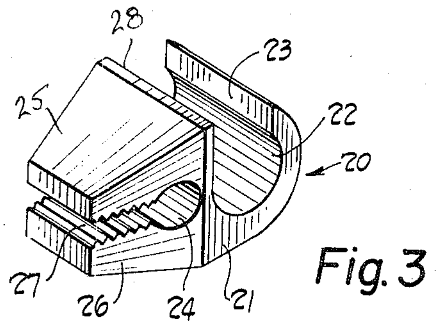
FIGURE 3 is a perspective view of another form of my molded plastic pipe support clip adapted to support a pipe line parallel to a beam flange.

An alternate type of clip construction is shown in FIGURE 3, broadly indicated by reference numeral 20.

In this form the body 21 also has a transverse slot 27 with a relief bore 24 at its inner end, defining two spaced and opposed legs 25 and 26.

Reference numeral 28 indicates a flat jaw lying in a plane crosswise of the legs. A second concave jaw 23 is positioned outward of the jaw 28, faced toward the jaw 28 and cooperating therewith to form a concave bed 22, open to the side of the body, for supporting a pipe 51 in a plane parallel to that of an angle-iron flange on which the clip is mounted, as shown in FIGURE 1.

The clip 20 is especially intended for the support of a pipe line 51 on the horizontal flange of an angle iron, in laterally spaced parallel relation thereto.

Furthermore, clip 20 holds the pipe line 51 against horizontal movement, so that it cannot be pushed or pulled, sideways, out of the clip.

The natural resiliency of the plastic material out of which the clips are made permits limited flexing of both the legs and jaws so that flanges and pipe varying within ¼″ from the norm may be easily accommodated.

The dielectric characteristics of the plastic from which the clips are molded permits the clips to be used to support copper piping safely on steel beams, since the clips themselves act as insulators.

It will now be clear that there has been provided a device which accomplishes the objective heretofore set forth.

While the invention has been disclosed in preferred and alternate forms, it is to be understood that the specific embodiments thereof as described and illustrated herein are not to be considered in a limited sense, as there may be other forms or modifications of the invention which should also be construed to come within the scope of the appended claims.

I claim:

1. A unitary molded plastic pipe support clip, adapted to engage a beam flange, comprising, a body having two depending, spaced, and opposed legs formed integral therewith; the body also having a transversely extending relief bore therethrough at the base of the legs, whereby the legs may be flexed relative to one another in constant parallel opposition; and two resilient upstanding and opposed concave jaws formed integral with the body and extending crosswise thereof at 90° to the legs and spaced upwardly therefrom; the legs being adapted to be flexed to admit and grip the edge of a beam flange therebetween to mount the clip thereon; the jaws being adapted to receive and support a pipe therebetween in spaced relation to said gripped beam flange and at 90° thereto.

2. A unitary molded plastic pipe support clip adapted to engage a beam flange, comprising a body having two depending, spaced, and opposed legs formed integral therewith and extending crosswise thereof; the body also having a transversely extending relief bore therethrough at the base of the legs, whereby the legs may be flexed relative to one another in constant parallel opposition; a first flat jaw formed integral with the body and extending crosswise thereof in a plane 90° to the legs; a second cooperating concave jaw, formed integral with the body, facing toward the first jaw and adapted to flex outwardly relative to said first jaw; the legs being adapted to admit and grip the edge of a beam flange therebetween to mount the clip thereon; the jaws being adapted to receive and support a pipe therebetween in spaced relation to said gripped beam flange and parallel thereto.

References Cited by the Examiner

UNITED STATES PATENTS

| | | | |
|---|---|---|---|
| 661,604 | 11/1900 | Grabler | 248—71 |
| 799,092 | 9/1905 | Rosenfeld | 248—68 |
| 944,731 | 12/1909 | Gold | 248—68 |
| 1,308,869 | 7/1919 | Rohmer | 248—69 |
| 1,459,582 | 6/1923 | Dubie | 24—257 |
| 1,515,418 | 11/1924 | Smith | 24—130 |
| 2,359,209 | 9/1944 | Ellinwood | 248—74 |
| 2,385,209 | 9/1945 | Joyce | 248—72 X |
| 2,470,811 | 5/1949 | Engleman | 24—81 |
| 2,737,204 | 3/1956 | LaBonte | 248—68 X |
| 2,969,216 | 1/1961 | Hallsey | 248—71 |
| 3,169,005 | 2/1965 | Wallach | 268—74 |

FOREIGN PATENTS

| | | |
|---|---|---|
| 924,741 | 3/1955 | Germany. |
| 1,128,233 | 4/1962 | Germany. |
| 17,683 | 8/1907 | Great Britain. |
| 893,448 | 4/1962 | Great Britain. |
| 590,916 | 4/1957 | Italy. |

CLAUDE A. LE ROY, *Primary Examiner.*